United States Patent
Dashevskiy et al.

(10) Patent No.: US 11,526,140 B2
(45) Date of Patent: *Dec. 13, 2022

(54) INTEGRATING CONTEXTUAL INFORMATION INTO WORKFLOW FOR WELLBORE OPERATIONS

(71) Applicants: Dmitriy Dashevskiy, Nienhagen (DE); Ingolf Wassermann, Hannover (DE)

(72) Inventors: Dmitriy Dashevskiy, Nienhagen (DE); Ingolf Wassermann, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/153,023

(22) Filed: Jan. 20, 2021

(65) Prior Publication Data

US 2021/0141350 A1 May 13, 2021

Related U.S. Application Data

(63) Continuation of application No. 15/597,700, filed on May 17, 2017, now Pat. No. 10,928,786.

(51) Int. Cl.
*E21B 41/00* (2006.01)
*G05B 15/02* (2006.01)
*E21B 44/00* (2006.01)

(52) U.S. Cl.
CPC .............. *G05B 15/02* (2013.01); *E21B 41/00* (2013.01); *E21B 44/00* (2013.01)

(58) Field of Classification Search
CPC ...... E21B 41/0092; E21B 41/00; E21B 44/00; E21B 47/12; G05B 15/02
See application file for complete search history.

(56) References Cited

U.S. PATENT DOCUMENTS

| 6,412,577 | B1 | 7/2002 | Chen |
| 2011/0161133 | A1 | 6/2011 | Staveley et al. |
| 2012/0144306 | A1 | 6/2012 | Moody et al. |

(Continued)

FOREIGN PATENT DOCUMENTS

| WO | 9715749 A2 | 5/1997 |
| WO | 2013019557 A2 | 2/2013 |
| WO | 2016168596 A1 | 10/2016 |

OTHER PUBLICATIONS

International Search Report and Written Opinion Issued in International Application No. PCT/US2018/032295 dated Sep. 17, 2018; 11 Pages.

(Continued)

*Primary Examiner* — Taras P Bemko
(74) *Attorney, Agent, or Firm* — Cantor Colburn LLP

(57) ABSTRACT

According to an embodiment, a computer-implemented method includes defining, by a processing device, the workflow as a plurality of steps. The method further includes defining, by the processing device, a contextual information field associated with at least one of the plurality of steps. The method further includes receiving, by the processing device, contextual information associated with the contextual information field. The method further includes displaying, by the processing device, the at least one of the plurality of steps of the workflow and the contextual information associated with the contextual information field by integrating the contextual information into the at least one of the plurality of steps.

15 Claims, 6 Drawing Sheets

(56) References Cited

U.S. PATENT DOCUMENTS

| | | |
|---|---|---|
| 2013/0290064 A1 | 10/2013 | Altamirano et al. |
| 2013/0332862 A1 | 12/2013 | Mirra et al. |
| 2014/0214476 A1 | 7/2014 | Dirksen et al. |
| 2015/0330201 A1 | 11/2015 | Dashevskiy |
| 2015/0331411 A1 | 11/2015 | Dashevskiy |
| 2016/0369616 A1 | 12/2016 | Leblanc et al. |
| 2018/0334887 A1 | 11/2018 | Dashevskiy et al. |

OTHER PUBLICATIONS

Brazilian Office Action Issued in Brazilian Application No. BR112019023997-9 dated Sep. 9, 2022; 4 Pages.

INTEGRATING CONTEXTUAL INFORMATION INTO WORKFLOW FOR WELLBORE OPERATIONS

CROSS REFERENCE TO RELATED APPLICATIONS

This application is a continuation of U.S. patent application Ser. No. 15/597,700 filed May 17, 2017, which is incorporated by reference herein in its entirety.

BACKGROUND

Embodiments of the present invention relate generally to downhole exploration and production efforts and more particularly to techniques for simplifying and speeding up decision making during procedure/workflow execution by providing contextual information.

Downhole exploration and production efforts involve the deployment of a variety of sensors and tools. The sensors provide information about the downhole environment, for example, by providing measurements of temperature, density, and resistivity, among many other parameters. Other tools can be at the surface, for example, such as top drive or pumps. This information can be used to control aspects of drilling and tools or systems located in the bottomhole assembly, along the drillstring, or on the surface.

SUMMARY

According to one embodiment of the invention, a computer-implemented method for integrating contextual information into a workflow for a wellbore operation is provided. The method includes defining, by a processing device, the workflow as a plurality of steps. The method further includes defining, by the processing device, a contextual information field associated with at least one of the plurality of steps. The method further includes receiving, by the processing device, contextual information associated with the contextual information field. The method further includes displaying, by the processing device, the at least one of the plurality of steps of the workflow and the contextual information associated with the contextual information field by integrating the contextual information into the at least one of the plurality of steps.

According to another embodiment of the invention, a system for integrating contextual information into a workflow for a wellbore operation is provided. The system includes a memory comprising computer readable instructions, and a processing device for executing the computer readable instructions for performing a method. The method includes receiving, by the processing device, contextual information associated with a contextual information field for a step of the workflow. The method further displaying, by the processing device, the step of the workflow and the contextual information associated with the contextual information field by integrating the contextual information into the step of the workflow. The method further includes controlling, by the processing device, an aspect of the wellbore operation based at least in part on the workflow.

BRIEF DESCRIPTION OF THE DRAWINGS

Referring now to the drawings wherein like elements are numbered alike in the several figures.

DETAILED DESCRIPTION

The present techniques relate to utilizing electronic workflows (i.e., procedures) to describe operating practices and facilitate their execution in a wellbore operation. This increases efficiency and consistency and provides automation of drilling services at the wellbore operation.

Typically, the execution of workflows can occur in a guided (manual) mode or an automated mode. In automated mode these decisions can be made automatically. In guided mode, a user may need particular contextual information to make decisions on how to proceed through the workflow. In such cases, contextual information used to make decisions during workflow execution is available to a field technician. The contextual information is generated by a variety of different tools, sensors, and software applications and is displayed on various screens/interfaces. Telemetry values, i.e. data from external systems, are generally only shown in electronic procedures at the moment when they are used in an instruction. However, it can be useful to include additional contextual information in the workflow to be presented to the user during procedure execution. This enables the user to proceed through steps of the workflow right away without having to locate the contextual information elsewhere (e.g., other systems) for further information.

The present techniques simplify and speed up workflow execution by integrating the contextual information (i.e., data) into the workflow. Additional benefits of the present techniques include reducing efforts to develop custom interfaces to display the context information, reducing training to learn to use separate interfaces that display the context information and providing information consistent with the currently approved workflow. Accordingly, the present techniques improve wellbore operations by enabling downhole tools and/or the drilling operation to be controlled more efficiently. For example, a user of the workflow can make decisions more accurately and quickly as a result of the integrated contextual information, which consequently improves the wellbore operation by implementing the workflow more accurately and quickly.

Figure 1:
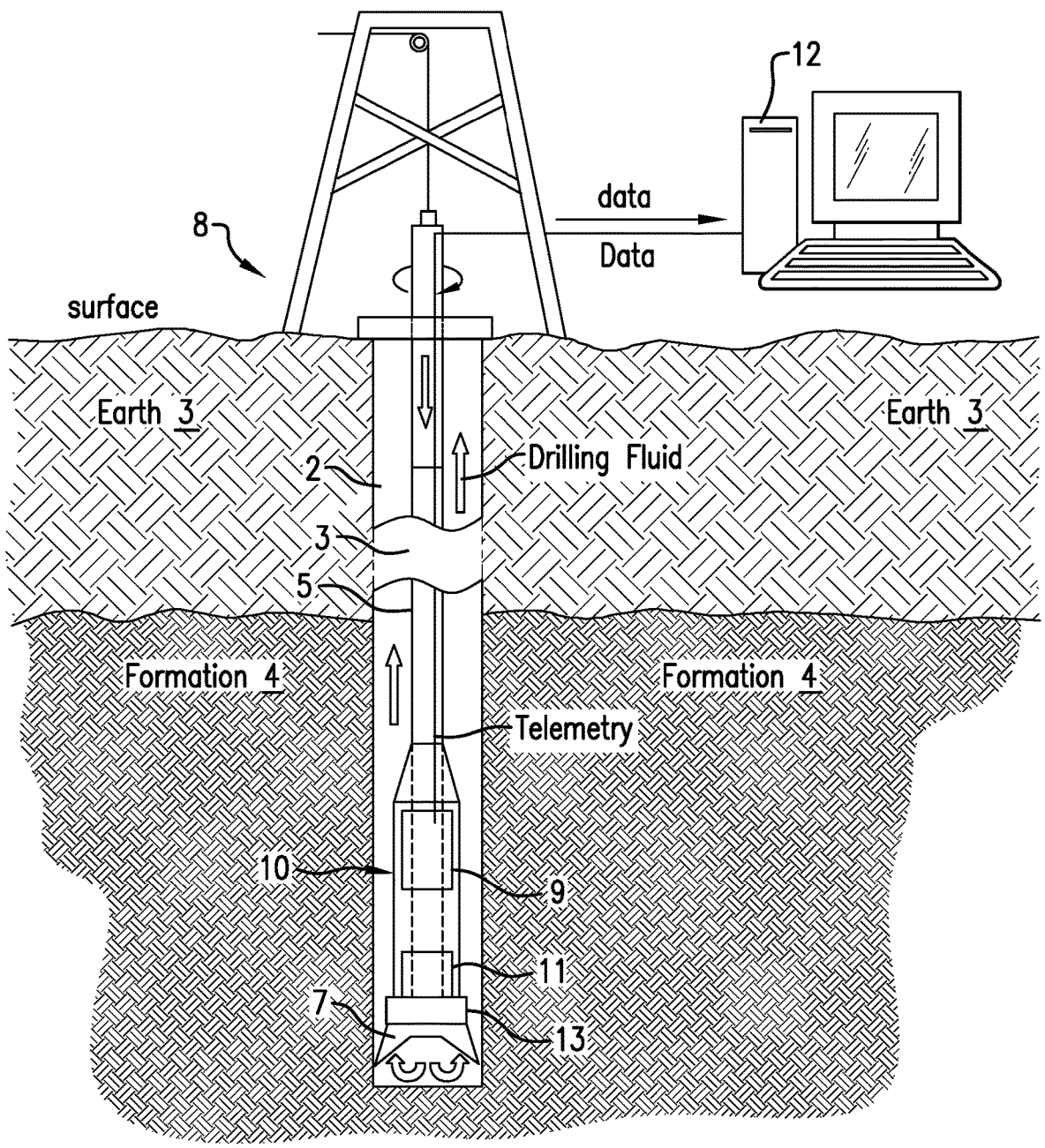
FIG. 1 depicts a cross-sectional view of a downhole system according to an embodiment of the invention.
Figure 2:
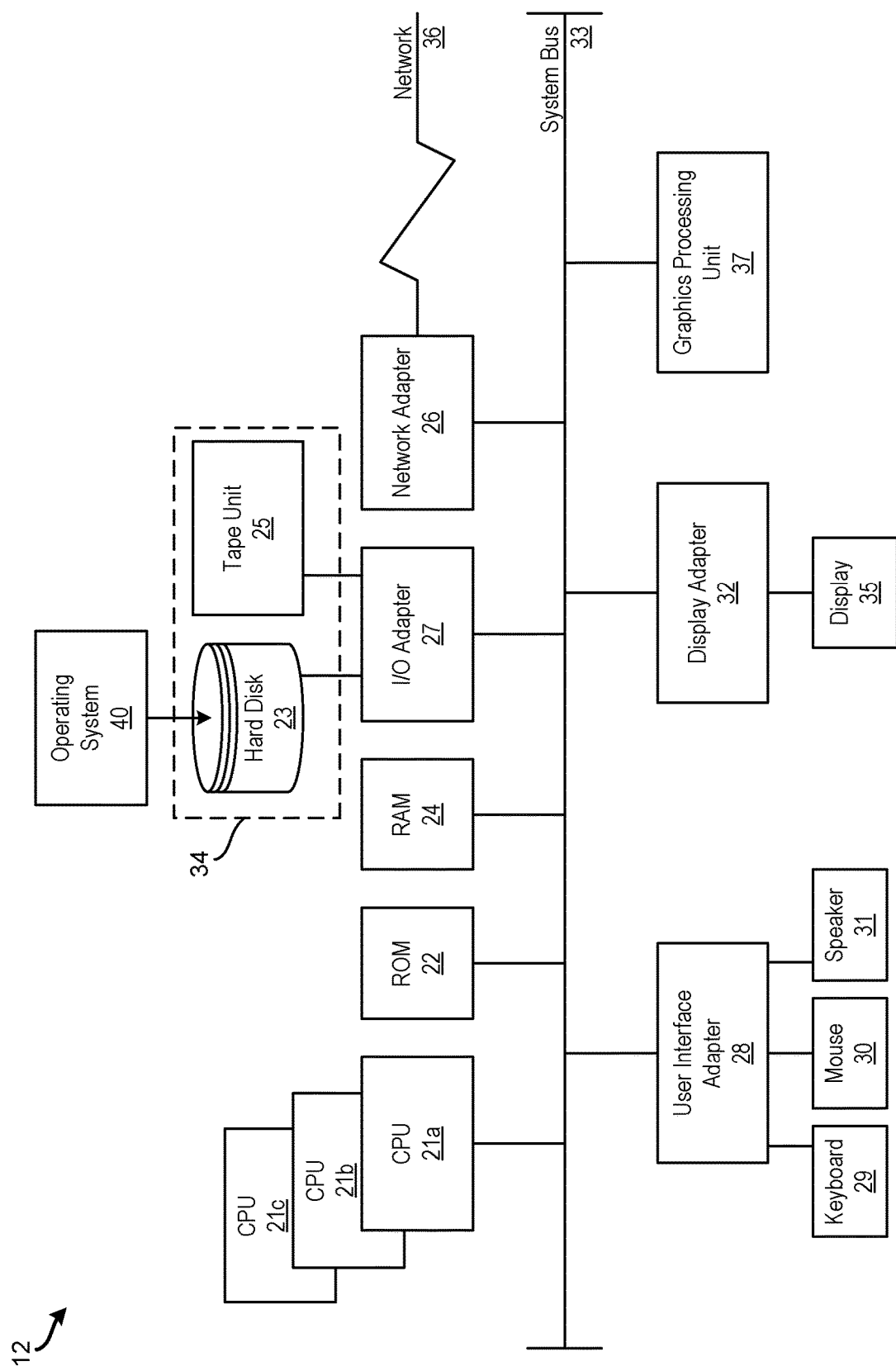
FIG. 2 depicts a block diagram of the processing system of FIG. 1, which can be used for implementing the techniques described herein to an embodiment of the invention.

FIG. 1 depicts a cross-sectional view of a downhole system according to an embodiment of the invention. The system and arrangement shown in FIG. 1 is one example to illustrate the downhole environment. While the system can operate in any subsurface environment, FIG. 1 shows downhole tools 10 disposed in a borehole 2 penetrating the earth 3. The downhole tools 10 are disposed in the borehole 2 at a distal end of a carrier 5, as shown in FIG. 1, or in communication with the borehole 2, as shown in FIG. 2. The downhole tools 10 can include measurement tools 11 and downhole electronics 9 configured to perform one or more types of measurements in an embodiment known as Logging-While-Drilling (LWD) or Measurement-While-Drilling (MWD).

According to the LWD/MWD embodiment, the carrier 5 is a drill string that includes a bottomhole assembly (BHA) 13. The BHA 13 is a part of the drilling rig 8 that includes drill collars, stabilizers, reamers, and the like, and the drill bit 7. The measurements can include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2.

Raw data and/or information processed by the downhole electronics 9 can be telemetered to the surface for additional processing or display by a processing system 12. Drilling control signals can be generated by the processing system 12 and conveyed downhole or can be generated within the downhole electronics 9 or by a combination of the two according to embodiments of the invention. The downhole electronics 9 and the processing system 12 can each include one or more processors and one or more memory devices. In alternate embodiments, computing resources such as the downhole electronics 9, sensors, and other tools can be located along the carrier 5 rather than being located in the BHA 13, for example. The borehole 2 can be vertical as shown or can be in other orientations/arrangements.

It is understood that embodiments of the present invention are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units (processors) 21a, 21b, 21c, etc. (collectively or generically referred to as processor(s) 21 and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 12.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 12 can be stored in mass storage 34. A network adapter 26 interconnects system bus 33 with an outside network 36 enabling processing system 12 to communicate with other such systems.

A display (e.g., a display monitor) 35 is connected to system bus 33 by display adaptor 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12.

Figure 3:
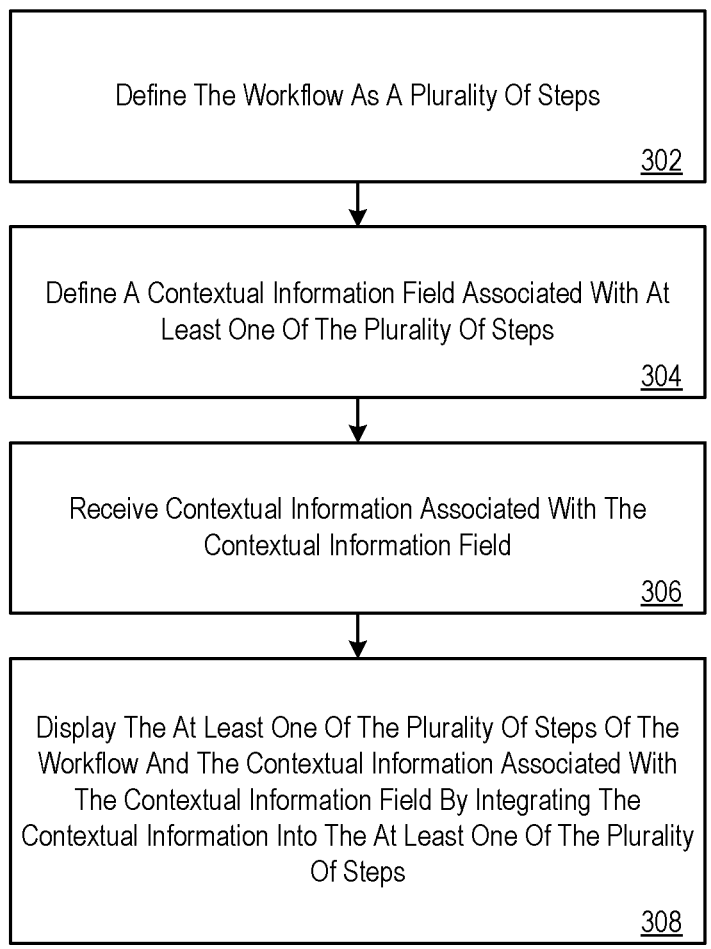
FIG. 3 depicts a flow diagram of a method 300 for integrating contextual information into a workflow for a wellbore operation to an embodiment of the invention.

FIG. 3 depicts a flow diagram of a method 300 for integrating contextual information into a workflow for a wellbore operation to an embodiment of the invention. The method 300 can be implemented by any suitable processing system, such as the processing system 12 of FIGS. 1 and 2.

At block 302, the processing system 12 defines a workflow as a plurality of steps. According to aspects of the present invention, the workflow represents a sequence of steps that, when performed, facilitate collecting measurements in a borehole, operating a drilling rig in the borehole to conduct drilling operations, and the like.

At block 304, the processing system 12 defines a contextual information field associated with one of the steps of the workflow. For example, a workflow author (i.e., a subject matter expert responsible for creating/authoring the workflow) defines during creation of a workflow where a step of the workflow contextual information can be useful. Contextual information can include a specific measurement record, parameter record, record from execution of another procedure, computation results, historical data, etc. Accordingly, the workflow author includes a contextual information field in the appropriate step of the workflow, such as through drag and drop of available contextual information fields. As an example, the contextual information field can be a "transmitter offset" field that will cause a transmitter offset value to be displayed in a particular step.

In another example, "widgets" can be created and used to define contextual information fields in the workflow. For example, a widget can be inserted into a step of the workflow during authoring. A listing available widgets can be presented to the workflow author, and the workflow author can incorporate (e.g., using "drag and drop") the widgets into a step of the workflow to associate a contextual information field with the step of the workflow. Additionally, a telemetry value can also be associated with the contextual information field.

At block 306, the processing system 12 receives the contextual information associated with the contextual information field. For example, if the contextual information field is a transmitter offset field, the contextual information received is the value of the transmitter offset, which can be retrieved from a database, detected from a sensor, received from a user in a prior step, and the like.

At block 308, the processing system 12 displays the plurality of steps of the workflow and the contextual information associated with the contextual information field by integrating the contextual information into the appropriate step. For example, a step of the workflow can reference contextual information, such as a numeric value that was entered in another step of the workflow. This may be referred to as "in-lining" of contextual information.

Additional processes also can be included, and it should be understood that the processes depicted in FIG. 3 represent illustrations, and that other processes can be added or existing processes can be removed, modified, or rearranged without departing from the scope and spirit of the present disclosure. For example, the method 300 can include controlling an aspect of the wellbore operation using the workflow. This can include controlling a drilling operation, controlling a downhole tool, and the like. Controlling the aspect of the wellbore operation is improved because a user is enabled to make faster, more accurate decisions using the integrated contextual information with the workflow.

Figure 4A:
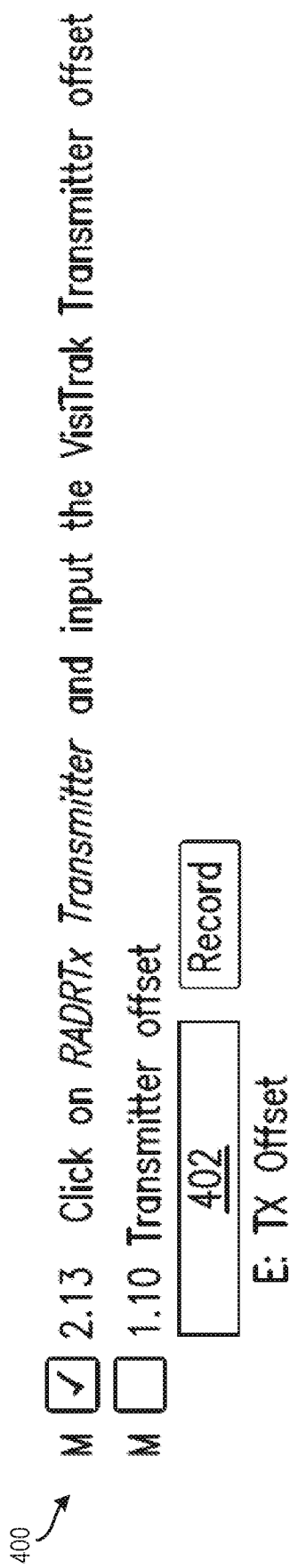
FIGS. 4A and 4B depict example workflow steps according to embodiments of the invention.

FIG. 4A depicts an example workflow step 400 without in-lining the referenced information. In the example of FIG. 4A, the step "transmitter offset" includes a field 402 for manually entering and recording the transmitter offset by a user of the workflow. The transmitter offset is input by the user after the user manually retrieves the transmitter offset, for example, from another software application, from another system, from a database, etc. This can introduce delay, user error, and other inefficiencies into the workflow.

Figure 4B:
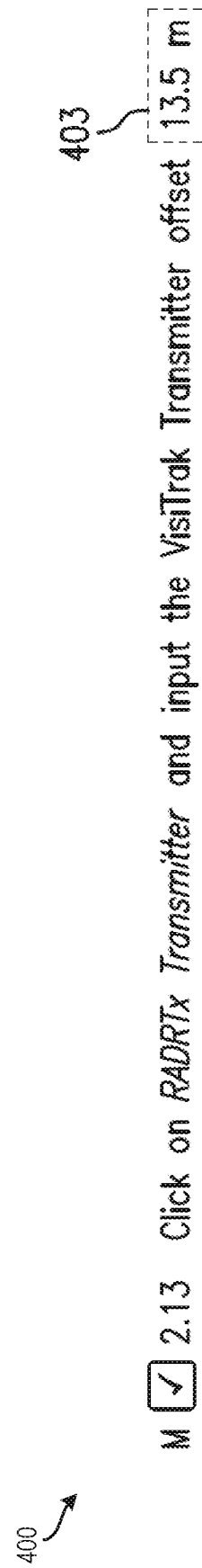

However, in the example of FIG. 4B in which in-lining is implemented, the transmitter offset value (e.g., a contextual value) 403 is integrated into the step 400 to directly display the transmitter offset value in-line with the step 400. This enables the user to more quickly complete the step 400 of the workflow.

Figure 5:
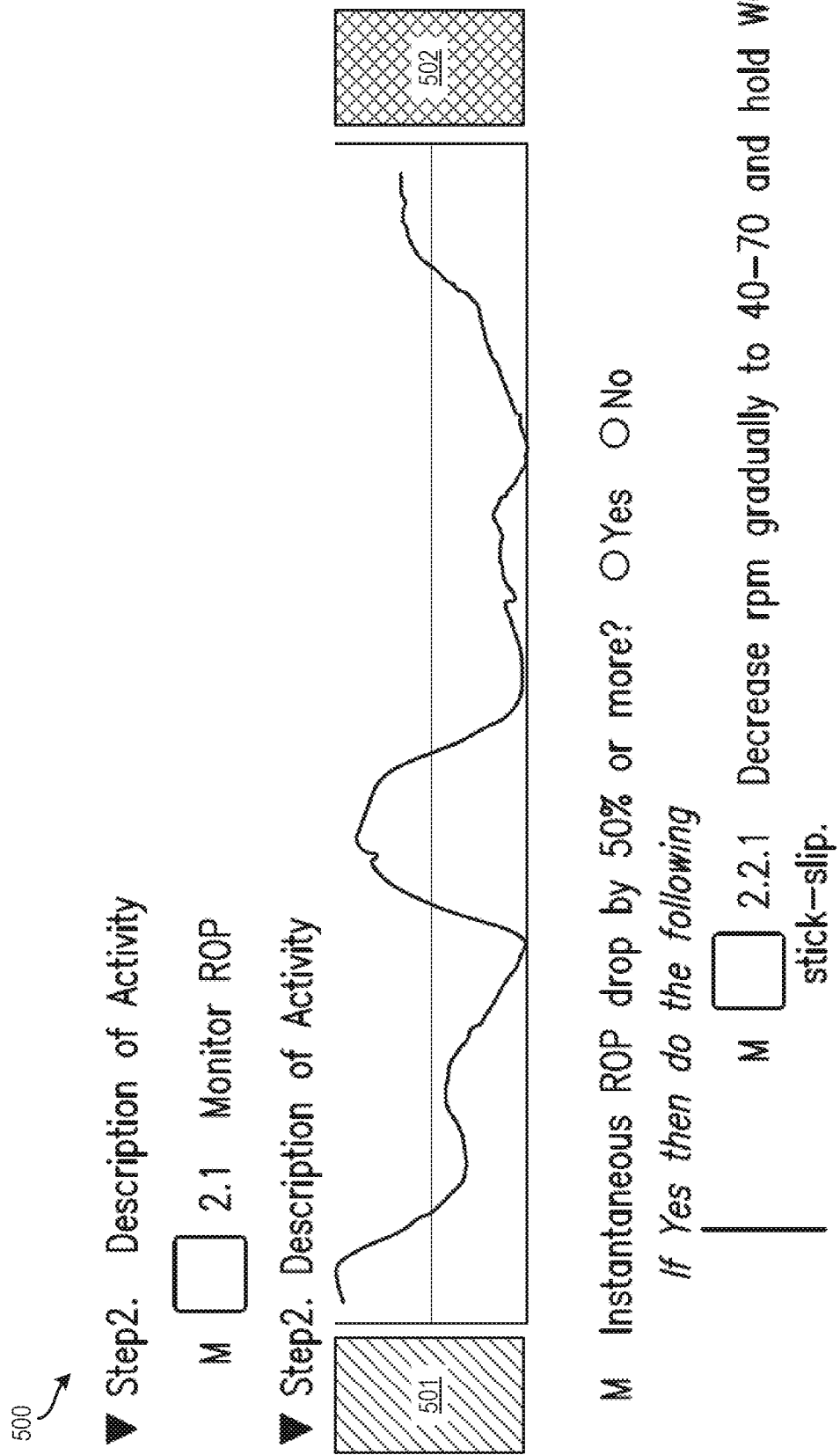
FIG. 5 depicts an example workflow step according to an embodiment of the invention.

In another example, as depicted in FIG. 5, contextual information can include multi-dimensional data that can be integrated into a step 500 of a workflow. For example, the step 500 (e.g., "Description of Activity") monitors rate of penetration (ROP) of a drilling operation. As depicted in FIG. 5, contextual information (in the form of a log widget 501 and a gauge widget 502) showing the historical ROP is integrated into the step 500 of the workflow. This enables a user of the workflow to answer a portion of the step 500 of the workflow (e.g., determine whether an instantaneous ROP drop of 50% or more occurred).

Figure 6:
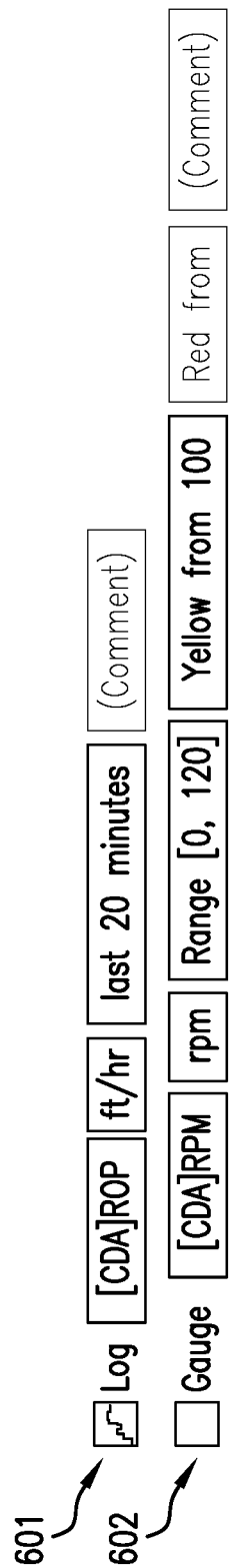
FIG. 6 depicts examples of multidimensional widgets that can be used to define contextual information fields according to an example of the invention.

FIG. 6 depicts examples of multi-dimensional widgets that can be used to define contextual information fields as described with respect to block 304 of FIG. 3. In particular, examples of multi-dimensional widgets can include a log widget 601 and a gauge widget 602. Each of the widgets 601, 602 include properties associated with the widgets 601, 602. For example, the widget 601 includes a parameter (e.g., ROP), a rate (e.g., feet/hour), and a time duration (e.g., last 20 minutes) as well as a comment. The widget 602 includes a parameter (e.g., rpm), a rate (e.g., RPM), a range (e.g., [0,120]), color indicators (e.g., yellow from 100, red from), and a comment. It should be appreciated that these are merely examples and that other types of widgets can be included and/or other properties can be associated with a widget. Once a widget is added to a step of the workflow, the widget can fetch the appropriate information from various sources, such as a database(s), a sensor(s), another system(s) and the like.

As one example, the present techniques can enable a user implementing the workflow to make quick, informed decisions that can increase wellbore operation efficiency, decrease non-production time, reduce potential for accidents, and other improvements. For example, if contextual information integrated into a workflow shows that the temperature of a well is increasing beyond a safe value, the user can immediately implement a step of the workflow to shut down the well and prevent a potential hazard.

Embodiment 1: A computer-implemented method for integrating contextual information into a workflow for a wellbore operation, the method comprising: defining, by a processing device, the workflow as a plurality of steps; defining, by the processing device, a contextual information field associated with at least one of the plurality of steps; receiving, by the processing device, contextual information associated with the contextual information field; displaying, by the processing device, the at least one of the plurality of steps of the workflow and the contextual information associated with the contextual information field by integrating the contextual information into the at least one of the plurality of steps; and controlling, by the processing device, an aspect of the wellbore operation based at least in part on the workflow.

Embodiment 2: According to at least one of the previous embodiments, the contextual information is a numeric value.

Embodiment 3: According to at least one of the previous embodiments, the contextual information is a graphical representation of a plurality of numeric values.

Embodiment 4: According to at least one of the previous embodiments, the contextual information is received from a sensor monitoring a property of the wellbore operation.

Embodiment 5: According to at least one of the previous embodiments, controlling an aspect of the wellbore operation comprises controlling a downhole tool based at least in part on the workflow.

Embodiment 6: According to at least one of the previous embodiments, controlling an aspect of the wellbore operation comprises controlling a drilling operation based at least in part on the workflow.

Embodiment 7: According to at least one of the previous embodiments, the contextual information field comprises a widget selected from a plurality of widgets.

Embodiment 8: A system for integrating contextual information into a workflow for a wellbore operation, the system comprising: a memory comprising computer readable instructions; and a processing device for executing the computer readable instructions for performing a method, the method comprising: receiving, by the processing device, contextual information associated with a contextual information field for a step of the workflow; displaying, by the processing device, the step of the workflow and the contextual information associated with the contextual information field by integrating the contextual information into the step of the workflow; and controlling, by the processing device, an aspect of the wellbore operation based at least in part on the workflow.

Embodiment 9: According to at least one of the previous embodiments, the method further comprises defining, by the processing device, the workflow as a plurality of steps, wherein the step is one of the plurality of steps.

Embodiment 10: According to at least one of the previous embodiments, the method further comprises defining, by the processing device, the contextual information field associated with the step.

Embodiment 11: According to at least one of the previous embodiments, the contextual information is a numeric value.

Embodiment 12: According to at least one of the previous embodiments, the contextual information is a graphical representation of a plurality of numeric values.

Embodiment 13: According to at least one of the previous embodiments, the contextual information is received from a sensor monitoring a property of the wellbore operation.

Embodiment 14: According to at least one of the previous embodiments, controlling an aspect of the wellbore operation comprises controlling a downhole tool based at least in part on the workflow.

Embodiment 15: According to at least one of the previous embodiments, controlling an aspect of the wellbore operation comprises controlling a drilling operation based at least in part on the workflow.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms can have been employed, they are unless otherwise stated used in a generic and descriptive sense only and not for purposes of limitation, the scope of the invention therefore not being so limited.

What is claimed is:

1. A computer-implemented method for integrating contextual information into a workflow for a wellbore operation, the method comprising:
   defining, by a processing device, the workflow as a plurality of steps;
   defining, by the processing device, a contextual information field associated with at least one of the plurality of steps;
   receiving, by the processing device, contextual information associated with the contextual information field;
   displaying, by the processing device, the at least one of the plurality of steps of the workflow and the contextual information associated with the contextual information field by integrating the contextual information into the at least one of the plurality of steps, wherein the contextual information is a transmitter offset value, wherein the textual description relates to the transmitter offset value, and wherein the transmitter offset value is directly displayed in-line with the textual description that relates to the transmitter offset value; and
   controlling, by the processing device, an aspect of the wellbore operation based at least in part on the workflow.

2. The computer-implemented method of claim 1, wherein the contextual information is a numeric value.

3. The computer-implemented method of claim 1, wherein the contextual information is a graphical representation of a plurality of numeric values.

4. The computer-implemented method of claim 1, wherein the contextual information is received from a sensor monitoring a property of the wellbore operation.

5. The computer-implemented method of claim 1, wherein controlling an aspect of the wellbore operation comprises controlling a downhole tool based at least in part on the workflow.

6. The computer-implemented method of claim 1, wherein controlling an aspect of the wellbore operation comprises controlling a drilling operation based at least in part on the workflow.

7. The computer-implemented method of claim 1, wherein the contextual information field comprises a widget selected from a plurality of widgets.

8. A system for integrating contextual information into a workflow for a wellbore operation, the system comprising:
   a memory comprising computer readable instructions; and
   a processing device for executing the computer readable instructions for performing a method, the method comprising:
   receiving, by the processing device, contextual information associated with a contextual information field for a step of the workflow;
   displaying, by the processing device, the step of the workflow and the contextual information associated with the contextual information field by integrating the contextual information into the step of the workflow, wherein the contextual information is a transmitter offset value, wherein the textual description relates to the transmitter offset value, and wherein the transmitter offset value is directly displayed in-line with the textual description that relates to the transmitter offset value; and
   controlling, by the processing device, an aspect of the wellbore operation based at least in part on the workflow.

9. The system of claim 8, wherein the method further comprises defining, by the processing device, the workflow as a plurality of steps, wherein the step is one of the plurality of steps.

10. The system of claim 8, wherein the method further comprises defining, by the processing device, the contextual information field associated with the step.

11. The system of claim 8, wherein the contextual information is a numeric value.

12. The system of claim 8, wherein the contextual information is a graphical representation of a plurality of numeric values.

13. The system of claim 8, wherein the contextual information is received from a sensor monitoring a property of the wellbore operation.

14. The system of claim 8, wherein controlling an aspect of the wellbore operation comprises controlling a downhole tool based at least in part on the workflow.

15. The system of claim 8, wherein controlling an aspect of the wellbore operation comprises controlling a drilling operation based at least in part on the workflow.

* * * * *